US010623470B2

(12) United States Patent
Ananthapur Bache et al.

(10) Patent No.: US 10,623,470 B2
(45) Date of Patent: *Apr. 14, 2020

(54) OPTIMIZING INTERNET DATA TRANSFERS USING AN INTELLIGENT ROUTER AGENT

(71) Applicant: INTERNATIONAL BUSINESS MACHINES CORPORATION, Armonk, NY (US)

(72) Inventors: Vijay Kumar Ananthapur Bache, Bangalore (IN); Vijay Ekambaram, Chennai (IN); Saravanan Sadacharam, Chennai (IN)

(73) Assignee: International Business Machines Corporation, Armonk, NY (US)

(*) Notice: Subject to any disclaimer, the term of this patent is extended or adjusted under 35 U.S.C. 154(b) by 180 days.

This patent is subject to a terminal disclaimer.

(21) Appl. No.: 15/622,462

(22) Filed: Jun. 14, 2017

(65) Prior Publication Data
US 2018/0367596 A1 Dec. 20, 2018

(51) Int. Cl.
H04L 29/08 (2006.01)
H04L 12/725 (2013.01)
G06F 16/182 (2019.01)

(52) U.S. Cl.
CPC ............ *H04L 67/06* (2013.01); *H04L 45/302* (2013.01); *H04L 45/308* (2013.01); *H04L 67/104* (2013.01); *H04L 67/1021* (2013.01); *H04L 67/18* (2013.01); *G06F 16/182* (2019.01)

(58) Field of Classification Search
CPC ......... H04L 67/06; H04L 67/36; H04L 67/18; H04L 45/302; H04L 45/308
See application file for complete search history.

(56) References Cited

U.S. PATENT DOCUMENTS

| 7,519,726 | B2 | 4/2009 | Palliyil et al. |
| 7,562,112 | B2* | 7/2009 | Harrow ............... H04L 47/10 709/203 |
| 7,698,376 | B2 | 4/2010 | Lin |
| 8,661,472 | B1* | 2/2014 | Kardatzke ........... H04N 21/482 725/48 |
| 8,813,222 | B1 | 8/2014 | Codreanu et al. |
| 9,208,097 | B2* | 12/2015 | Richardson ......... G06F 12/0813 |

(Continued)

OTHER PUBLICATIONS

IBM: List of IBM Patents or Patent Applications Treated as Related (Appendix P), Oct. 4, 2017, pp. 1-2.

(Continued)

*Primary Examiner* — John M Macilwinen
(74) *Attorney, Agent, or Firm* — Michael A. Petrocelli

(57) ABSTRACT

A method and system for optimizing data transfers includes generating a hash signature for a requested data file using a router agent of a Local Area Network (LAN), in response to an initiating user requesting the requested data file using a computer on a LAN communicating with a WAN/Internet, and the router agent configuring a file byte-stream for requested data files from the Wide Area Network (WAN/Internet). The generated hash signature of the requested data file is compared with an existing hash signature of an existing data file accessible using the local area network (LAN). The requested data file can be downloaded locally if a user accepts a local download of the requested data file being accessible using the LAN, in response to the generated hash signature matching the hash signature of the existing data file.

20 Claims, 10 Drawing Sheets

(56) References Cited

U.S. PATENT DOCUMENTS

| | | | |
|---|---|---|---|
| 2003/0145093 A1* | 7/2003 | Oren | H04L 29/06 709/229 |
| 2004/0148344 A1* | 7/2004 | Navar | H04L 29/06 709/203 |
| 2004/0181687 A1 | 9/2004 | Nachenberg et al. | |
| 2006/0294561 A1* | 12/2006 | Grannan | H04N 7/17327 725/101 |
| 2007/0244920 A1 | 10/2007 | Palliyil et al. | |
| 2013/0226888 A1 | 8/2013 | Govind et al. | |
| 2014/0172971 A1* | 6/2014 | Akkurt | H04L 67/1029 709/204 |
| 2015/0201033 A1 | 7/2015 | Gupta | |
| 2015/0249694 A1 | 9/2015 | Kinkade et al. | |
| 2018/0191806 A1* | 7/2018 | Ambar | G06Q 50/01 |

OTHER PUBLICATIONS

Pending U.S. Appl. No. 15/703,226, filed Sep. 13, 2017, entitled: "Optimizing Internet Data Transfers Using an Intelligent Router Agent", pp. 1-52.

Choi et al., "In-Network Caching Effect on Optimal Energy Consumption in Content-Centric Networking", IEEE ICC 2012—Next-Generation Networking Symposium, pp. 2889-2894.

Fricker et al., "Impact of Traffic Mix on Caching Performance in a Content-Centric Network", arXiv:1202.0108v1, Feb. 1, 2012, pp. 1-12.

Wikipedia, the free encyclopedia, "Content Delivery Network", printed on May 8, 2017, pp. 1-7, https://en.wikipedia.org/wiki/Content_delivery_network.

Savant et al., "Server Friendly Delta Compression for Efficient Web Access", Web Content Caching and Distribution, Proceedings of the 8th International Workshop, 2004, pp. 303, 318-322.

Mell et al., "The NIST Definition of Cloud Computing", Recommendations of the National Institute of Standards and Technology, Special Publication 800-145, Sep. 2011, 7 pages.

Karger et al., "Web Caching with Consistent Hashing", MIT Laboratory for Computer Science, Mar. 4, 1999, pp. 1-17.

Ananthapur Bache, et al., "Optimizing Internet Data Transfers Using an Intelligent Router Agent", U.S. Appl. No. 16/390,600, filed Apr. 22, 2019.

List of IBM Patents and Patent Applications Treated as Related. Filed Apr. 22, 2019. 2 pages.

* cited by examiner

ОPTIMIZING INTERNET DATA TRANSFERS USING AN INTELLIGENT ROUTER AGENT

BACKGROUND

The present disclosure relates to a method and system for optimizing data transfers using a network which accesses a Wide Area Network (WAN/Internet). More specifically, the present disclosure relates to optimizing data transfers using a network (for example, a Local Area Network (LAN)) which accesses a Wide Area Network (WAN/Internet) for downloading data (e.g., one or more files).

For instance, downloading data including one or more files can be initiated by a user having a computer connected to the network (e.g., LAN). In one example, data files are commonly downloaded using routing technology in order to manage bandwidth usage on a Local Area Network (LAN). Bandwidth refers to the transmission capacity of an electronic communications device or system and the speed at which data transfers can occur over the device or system. Stated differently, bandwidth describes the maximum data transfer rate of a network or Internet connection. It measures the amount of data that can be sent over a specific connection in a given amount of time. Initiation of a data file download from a user connected to a LAN and accessing a WAN/Internet, which can include the Internet, requires WAN/Internet or Internet connectivity of the user and the LAN. A consideration for efficient data file downloading is the amount of bandwidth available and required for a file transfer to a LAN from the WAN/Internet. Typically, a set amount of bandwidth can be associated with a LAN. This bandwidth is typically shared among LAN users, which for example, may include several users or hundreds (e.g., a small or large office setting). Bandwidth can be used, for example, by users accessing a WAN/Internet from the LAN for all types of data, which can include streaming data such as audio or video, accessing file data, and file downloads.

Bandwidth requirements can be considered to begin and maintain a data download associated with a data file from a WAN/Internet for downloading to the user on the LAN. The burden on a computer network (e.g., a LAN) is determined by the amount of bandwidth available and the size of the data being downloaded (e.g., associated with data or a file for downloading). In some instances, several users can attempt to download large data files at the same time.

In some instances a data or data file download can occur slowly, in response to a user initiated download of a large amount of data or a large file from an external server that is outside of a user's LAN. In this example, multiple downloads can consume large amounts of bandwidth on a LAN. In most cases, there is a finite amount of bandwidth available on a LAN, and it becomes increasingly difficult for LAN users to access data outside the LAN (for example using an Internet connection) as the amount of available bandwidth decreases. As users request and transfer data or data files, bandwidth is allocated and consumed by the LAN users. In some instances, users re-download large amounts of data and/or data files that already exist locally, that is, on a LAN. These repeated downloads can consume a large part or even exhaust a LAN's bandwidth, slow download/upload speeds, burden user computing resources, and diminish WAN/Internet or Internet connections for all LAN users.

SUMMARY

In one example, a download identifier is created when a file download request is initiated by a user. A uniform resource locator (URL) can also be dynamically created for each file download. Both steps require the consumption of computing resources each time a file is downloaded. Creating a new download identifier for each file makes it difficult to track what files exist in a network. Because every file downloaded has a unique identifier, it is difficult to readily determine if a file being downloaded is the same file already stored locally in a LAN. As a result, a user may often download a file that is already stored in the LAN. This can result in the unnecessary consumption of bandwidth as well as storage space in the LAN. Essentially, repeating the download process where a file already exist in a LAN can be inefficient.

It would be advantageous to reduce the number of file downloads into a LAN. Less file downloads results in less bandwidth of the LAN being consumed. In one aspect of the present invention, a method and system is provided for optimizing data file downloading by comparing a hash signature of a data file being downloaded by a user to identify when the file exists locally (i.e., a copy of the file). When the file for downloading is identified locally, the method and system according to the present invention can enable the locally stored file to be downloaded to the user. Thus, downloading a remotely stored file can be avoided by downloading the file locally, and less bandwidth of the LAN is consumed, resulting in a more efficient network.

According to an aspect of the present invention, a method optimizes data file transfers across the internet using a router agent. The method includes generating a hash signature for a requested data file using a router agent of a Local Area Network (LAN), in response to an initiating user requesting the requested data file using a computer on a LAN communicating with a Wide Area Network (WAN/Internet), the requested data file being stored on a remote computer readable storage medium accessible using the WAN/Internet, and the router agent configuring a file byte-stream for requested data files from the Wide Area Network. The method includes a comparison of the generated hash signature of the requested data file based on the configured file byte-stream, with an existing hash signature of an existing data file stored on a local computer readable storage medium accessible using the local area network. The method includes prompting a user to accept a local download using the LAN of the existing data file on the local computer readable storage medium, in response to the generated hash signature matching the existing hash signature of the existing data file, whereby the existing data file is a copy of the requested data file.

In another aspect according to the present invention, a system optimizes data file transfers across the internet using a router agent. The system comprises a computer system comprising: a computer processor, a computer-readable storage medium, and program instructions stored on the computer-readable storage medium, and program instructions stored on the computer-readable storage medium being executed by the processor, to cause the computer system to perform a method, comprising: generating a hash signature for a requested data file using a router agent of a Local Area Network (LAN), in response to an initiating user requesting the requested data file using a computer on a LAN communicating with a Wide Area Network (WAN/Internet the requested data file being stored on a remote computer readable storage medium accessible using the WAN/Internet, and the router agent configuring a file byte-stream for requested data files from the Wide Area Network. The system includes a comparison of the generated hash signature of the requested data file based on the configured file byte-stream, with an existing hash signature of an existing data file stored on a local computer readable storage medium accessible using the local area network. The system includes prompting a user to accept a local download using the LAN of the existing data file on the local computer readable storage medium, in response to the generated hash signature matching the existing hash signature of the existing data file, whereby the existing data file is a copy of the requested data file.

In another aspect according to the present invention, a computer program product optimizes data file transfers across the Internet using a router agent. The computer program product comprises a computer readable storage medium having program instructions embodied therewith, wherein the computer readable storage medium is not a transitory signal per se, and the program instructions executable by a computer to cause the computer to perform a method, comprising: generating a hash signature for a requested data file using a router agent of a Local Area Network (LAN), in response to an initiating user requesting the requested data file using a computer on a LAN communicating with a Wide Area Network (WAN/Internet), the requested data file being stored on a remote computer readable storage medium accessible using the WAN/Internet, and the router agent configuring a file byte-stream for requested data files from the Wide Area Network. The computer program product includes a comparison of the generated hash signature of the requested data file based on the configured file byte-stream, with an existing hash signature of an existing data file stored on a local computer readable storage medium accessible using the local area network. The computer program product includes prompting a user to accept a local download using the LAN of the existing data file on the local computer readable storage medium, in response to the generated hash signature matching the existing hash signature of the existing data file, whereby the existing data file is a copy of the requested data file.

BRIEF DESCRIPTION OF THE SEVERAL DRAWINGS

DETAILED DESCRIPTION

Figure 1:
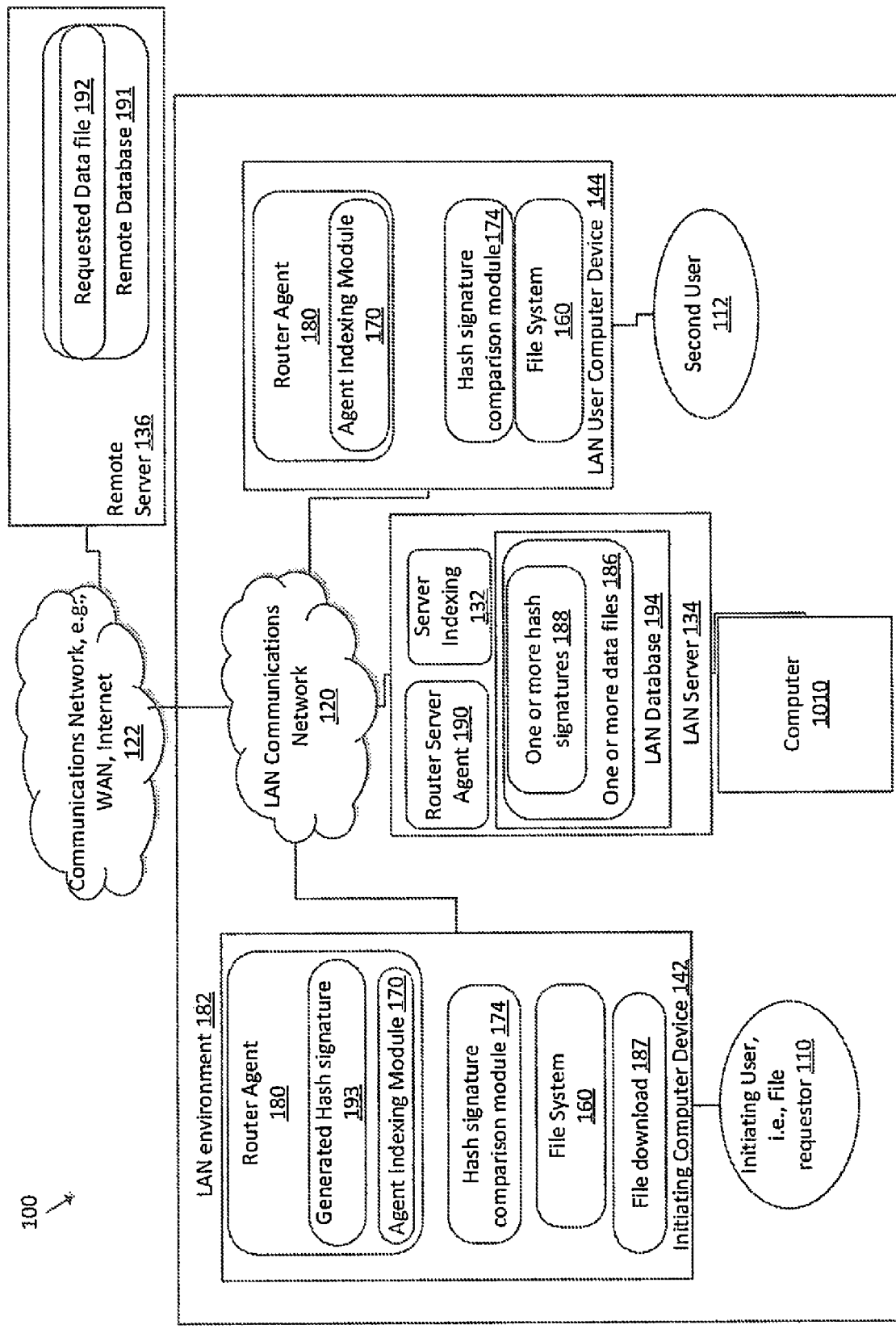
FIG. 1 depicts a schematic block diagram illustrating an overview of a system and methodology according to an embodiment of the present disclosure for optimizing data file transfers utilizing a router agent.

Referring to FIG. 1, a system 100, depicts a methodology for transferring (e.g., downloading or copying) one or more files from a Wide Area Network (WAN/Internet) 122, for example, the Internet, using a Local Area Network communications network (LAN) 120 in a computer networked environment (also referred to as a LAN environment) 182. The WAN/Internet 122 can connect to a local area network (LAN) environment 182 via a LAN communications network 120. The LAN environment 182 includes a computer network that interconnects computers within a limited area such as a residence, school, laboratory, university campus or office building and has its network equipment and interconnects locally managed. A LAN communications network 120 can allow a LAN user access to data files which are outside of the LAN environment 182. The WAN/Internet 122 can connect to a remote server 136 which can store data files. An initiating user (also referred to as an end user, file requester or first LAN user) 110 can initiate a request for a data file, also referred to as a download request, using an initiating computing device 142. The initiating computer device 142 can be but is not limited to, for example: a mobile device, desktop, laptop or tablet. The initiating computer device 142 can include a file system 160 which stores files on the computing device.

In one example, the initiating user 110 using a computer device 142 initiates a download request. A router agent 180 is located on the initiating computer device 142. The download request represents an attempt by the initiating user 110 to gain access to a data file, that is, to download a data file, specifically a requested data file 192 on the remote server 136 and which is accessible using the WAN/Internet. The initiating computer device 142 can also include a hash signature comparison module 174.

A hash signature is a unique key used to identify data files downloaded by a network. A hash signature is one embodiment of a file signature, which as explained in more detail below, can be applied as the file is downloaded. The hash signature comparison module 174 compares a hash signature generated by the router agent 180 and referred to as a generated hash signature 193 of the requested data file 192, and an existing hash signature 188 of an existing data file 186. In FIG. 1 the existing hash signature 188 is depicted as one or more hash signatures 188. The existing data file 186 is depicted as one or more data files 186. The hash signature comparison module 174 determines whether the requested data file 192 exists in the LAN environment 182 (e.g., stored in the LAN database 194) and is accessible in the LAN environment 182 using the LAN communications network 120. The hash signature comparison includes comparing the generated hash signature 193 of the requested data file 192 to a number of existing hash signatures 188 for existing data files 186 stored in the LAN environment 182.

The router agent 180 is a computing component in the LAN environment 182 that can create file signatures, e.g., hash signatures for the requested data file 192 based on a file requestor 110 on the network attempting to access a file over a WAN/Internet 122. The router agent 180 can also communicate with other router agents in a centralized or distributed LAN architecture.

In the present disclosure, the router agent 180 generates a hash signature for the requested data file 192. The generated hash signature is generically shown as generated hash signature 193 in FIG. 1. The generated hash signature 193 identifies the requested data file 192 on the WAN/Internet 122. Upon completion, the file download 187 can be stored locally on a client machine, for example, on the initiating computer device 142 or on a LAN database 194 located centrally in the LAN environment 182. In a future download request, the previously downloaded and stored file is considered an existing data file 186 with respect to a subsequent requested data file 192.

The router agent 180 can include an agent indexing module 170. The agent indexing module 170 maintains a local record of an existing hash signature 188 which is mapped to an existing data file 186. This local record can be referred back to for later retrieval of an existing data file 186. The local record is created after the file download 187 is successfully completed. It is understood, that prior to a successful download of a requested file, the requested data file 192 may not exist in the LAN environment 182 (for example, unless it was loaded and saved in the LAN environment by another means, e.g., flash drive or portable hard drive).

A second user, also referred to as a LAN user 112, has a LAN user computing device 144, which includes similar elements as the initiating user computer device 142, including a file system 160, a hash signature comparison module 174 and a router agent 180. The router agent 180 of the LAN user computer device 144, can also contain an agent indexing module 170.

The initiating computer device 142 and the LAN user computer device 144 may communicate over a LAN communications network 120 to communicate with the wide area network (WAN/Internet), e.g., the Internet 122. The WAN/Internet 122 can include a plurality of networks and computers associated therein and are generically represented as a remote server 136. The remote server 136 can contain a remote database 191. The remote database 191 contains one or more requested data files 192 which are not currently indexed in the LAN environment 182. In the present embodiment, the requested data file 192 is stored on the remote server 136. The requested data file 192 can be requested by the initiating user 110. The requested data file 192 is a data file that will be downloaded for the first time into the LAN environment 182.

A LAN server 134 may contain a router server agent 190, a LAN database 194 and a server indexing 132. The LAN server 134 is a computer or computer program that manages access to a centralized resource or service in a network for devices attached to it. In this embodiment, the LAN server 134 manages access to the LAN database 194 and LAN communications network 120 for the initiating user computer device 142 and the LAN user computer device 144. The LAN database 194 is a structured set of data held in a computer that is accessible by a medium such as computer software. The LAN database 194 can store existing data files on the network, i.e. an existing data file 186 and its associated hash signature which is referred to as an existing hash signature 188. A router server agent 190 generally determines which router agent 180 is optimal for the execution of a file download 187. This determination will be detailed below with the explanation for FIG. 5.

When a requested data file 192 is downloaded for the first time into the LAN environment 182, the server indexing 132 can create an entry which identifies the location of the requested data file 192 after the file download 187. That is, the server indexing 132 indexes requested data files 192 in the LAN database 194. An index is a copy of selected columns of data that can be searched to find data file records. The server indexing 132 creates a record of each requested data file 192 in the LAN database 194 for quicker retrieval by the router server agent 190. The created record becomes an existing data file 186 with an existing hash signature 188 with respect to a subsequent download request. The LAN database 194 can contain at least one existing data file 186 and its existing hash signature 188. As described above, an existing data file 186 is a file previously downloaded into the LAN environment 182 and stored for future use. An existing hash signature 188 is the hash signature generated during a prior download of the data file. The existing hash signature 188 is used to identify an existing file 186 in the LAN environment 182. The LAN communications network 120 can serve as a central connection point for the LAN server 134, the initiating computer device 142 and the LAN user computer device 144. The router server agent 190 operates in tandem with the router agent 180 to monitor the network for requested data files 192 and to decide whether to download such files locally within the LAN environment 182 or outside of it on the WAN/Internet 122. The LAN server 134 can be managed by a computer system 1010. Computer system 1010 will be discussed later with the discussion of FIG. 6.

Figure 2:
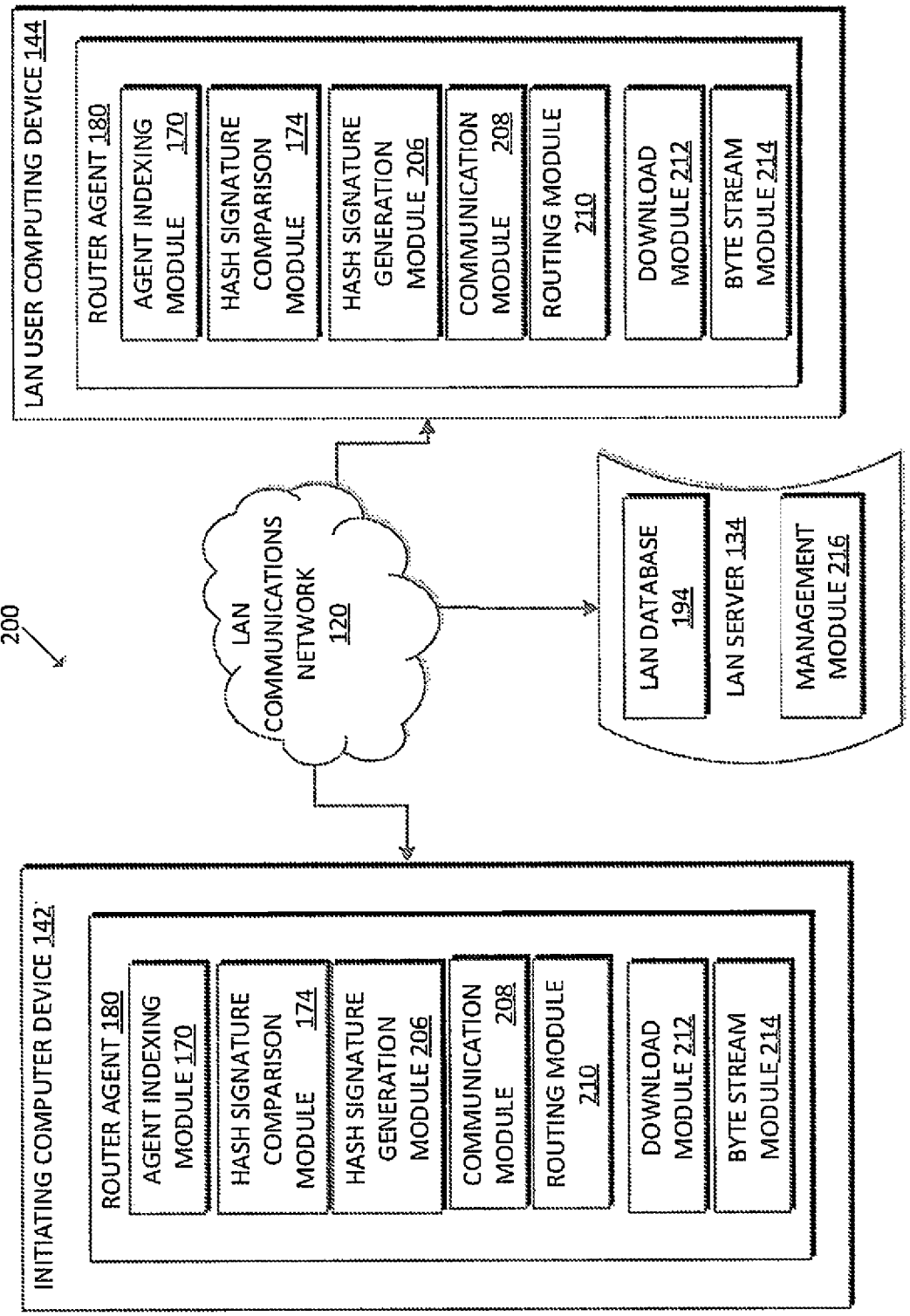
FIG. 2 is a schematic block diagram depicting computer systems according to an embodiment of the disclosure which includes a more detailed depiction of computers shown generally in FIG. 1, and which cooperate with the system shown in FIG. 1.

Referring to FIG. 2, an embodiment of the system, 200 is described. In one embodiment, a local client computer (or client computer) embodied as an initiating computer device 142 contains a router agent 180. A second local computer (or client computer) embodied as a LAN user computing device 144, also contains a router agent 180. The LAN user computing device 144 represents all other LAN users in the network. The initiating computer device 142 and LAN user computing devices 144, are part of a networked connection 120. The router agent 180 includes an agent indexing module 170, a hash signature comparison module 174, a hash signature generation module 206, a communication module 208, a routing module 210, a download module 212 and a byte stream module 214. The hash signature comparison module 174 can perform a hash signature comparison 195 of the requested data file's 192 generated hash signature 193 with that of an existing data file 186 in the LAN database 194. This hash signature comparison 195 is performed by a router agent 180. The hash signature comparison 195 can determine whether an initiating user's 110, requested data file 192 should be downloaded locally within the LAN environment 182 or from the WAN/Internet 122. A router agent 180 uses the hash signature generation module 206 to generate a hash signature for a requested data file 192. A hash signature is generated using hash functions. A hash function takes an input (x) and produces output (y) such that, no other input than (x) will be able to produce the output (y). In the present invention, (x) is the initial byte stream of the file. The output (y) could be a transformed integer or float and can also be represented as a number of bytes. The resulting hash signature is referred to as a generated hash signature 193 and identifies a requested data file 192. A router agent 180 uses the routing module 210 to initiate a file download 187 from a local location on the LAN environment 182 based upon the hash signature comparison determining that the requested data file 192 is a copy of an existing file 186. The router agent 180 uses the download module 212 to initiate and complete the download of a file download 187 from an external source, i.e. the WAN/Internet 122 or locally within the LAN environment 182 after the hash signature comparison determines whether the requested file 192 exists on the LAN as an existing data file 186 and the initiating user 110 acts in response to a prompt to choose a download location.

The file byte stream module 214 can configure an initial file byte stream of a requested data file 192 (FIG. 1). The initial file byte-stream is configured by the router agent 180 determining the size in bytes of the requested data file 192. Once the size of the requested data file 192 is determined, a hash signature is assigned to the requested data file 192 (as discussed above). The initiating computer device 142 and sending computing devices 144, are part of a networked connection 120. The networked connection exists for the purpose of allowing devices connected to the network to access the Internet and transmit data within the network or outside of it.

A central server depicted as a LAN server 134 includes a LAN database 194. The LAN server may also contain a management module 216 which manages the network 120, as well as the initiating computer device 142 and the LAN user computing device 144. The LAN database 194 can store data files that are downloaded into the LAN environment 182 by LAN users. The agent indexing module 170 can store a requested data file's 192 generated hash signature 193. The generated hash signature is stored for later comparison by the hash signature comparison module 174, in order to determine whether there is a match between an existing data file 186 and a requested data file 192 such that the two data files are identical.

It is important to note that the components depicted in FIG. 2 can be located on a local server or on a remote server. The components may be accessible by the LAN or on individual computers. The components may also be run as a service for all users in the LAN environment 182. Although FIG. 2 depicts the method components on a local server, other embodiments can include the method components on a remote server.

Figure 3:
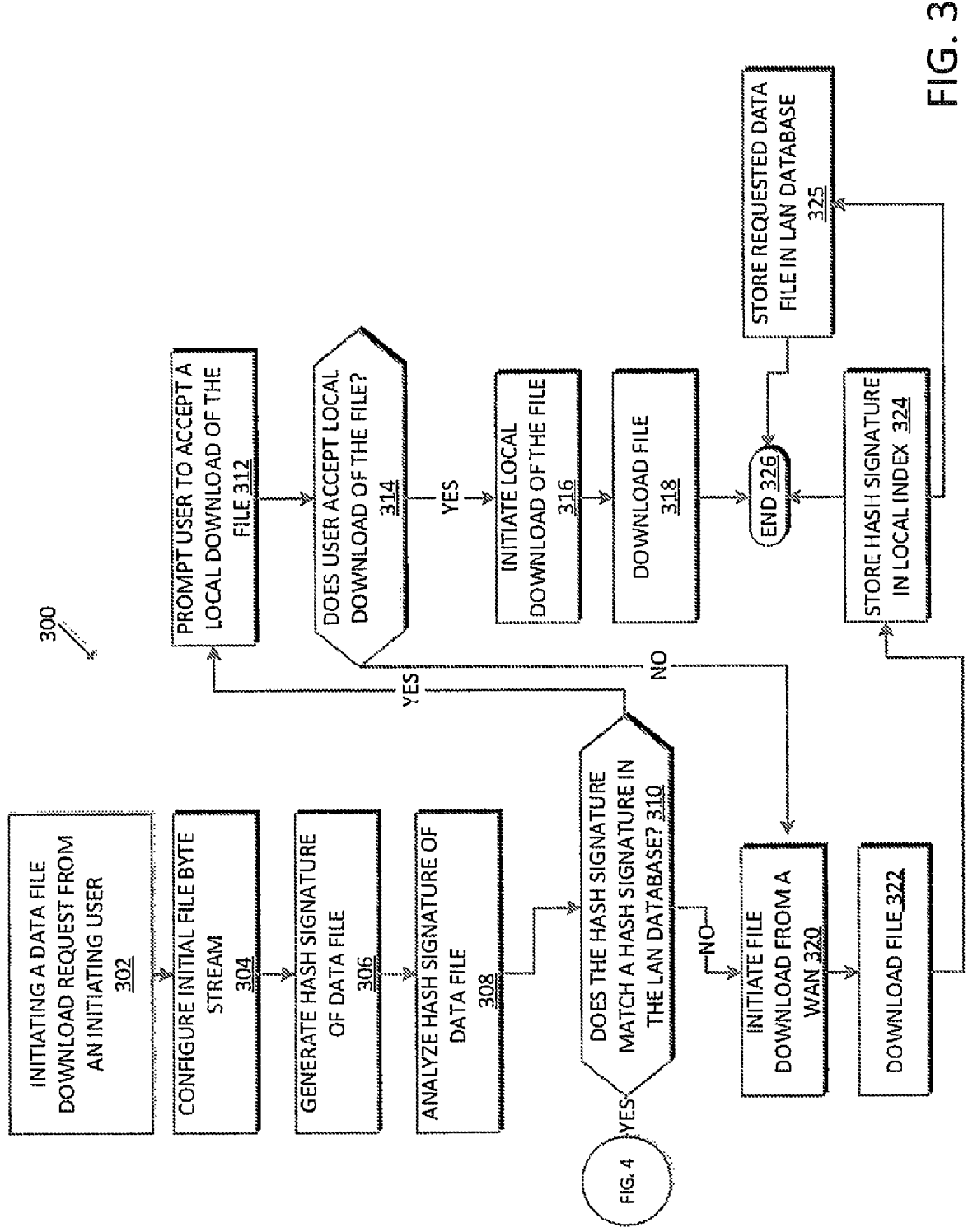
FIG. 3 is a flow chart illustrating a method according to an embodiment of the disclosure for optimizing data transfers using an intelligent router agent based on the system shown in FIG. 1.

Referring to FIG. 3, a method 300 for optimizing data transfers using a hash signature comparison module 174 can be implemented using the system 100 shown in FIG. 1. At block 302, a data file download request is generated in response to an initiating user 110 using an initiating computer device 142 to initiate the data file download request. As discussed above with reference to FIG. 1, the initiating user 110 and the initiating computer device 142 are situated or part of the LAN environment 182.

An initial file byte stream is configured at block 304. The initial byte file byte stream is configured by a router agent 180 (shown in FIG. 1). The router agent 180 configures an initial file byte stream by checking existing files in a LAN environment 182, and computing the minimum possible length (L) of a file such that "L" length byte stream of all files in the network are unique. This file byte stream configuration determines the size of a requested data file 192.

The router agent 180 uses the initial file byte stream to generate a generated hash signature 193 of the requested data file 192 at block 306. The generated hash signature 193 servers as a unique identifier for the requested data file 192 in the LAN environment 182.

The method analyzes the generated hash signature 193 of the requested data file 192 at block 308. The analysis at block 308 uses at least one router agent 180 and the hash signature comparison module 174 to run a hash signature comparison 195 (shown in FIG. 5). The hash signature comparison 195 is executed between an existing data file's 186 existing hash signature 188 and a requested data file's 192 generated hash signature 193 in order to determine if there is a hash signature match in the LAN index as in block 310. A hash signature match 196 (shown in FIG. 5) is determined by comparing the generated hash signature 193 of the requested data file 192 with an existing hash signature 188 of an existing data file 186 stored on a local computer readable storage medium accessible using the local area network (LAN) 182. The hash signature match 196 can be determined by the hash signature comparison module 174 comparing the number of bytes of the generated hash signature 193 and the existing hash signature 188, and determining that they contain the same number of bytes, thereby indicating an identical record.

If the hash signature comparison 195 performed at block 310 results in a match, the user 110 is prompted to accept a local download of the requested data file 192 at block 312. The prompt can be in the form of an interactive message visible to the user 110. In another example, the router agent 180 can prompt the initiating user 110 via a pop up message in the initiating user's 110 web browser.

The initiating user 110 can accept the prompt at block 314. The method 300 can reject the requested data file 192 using a router agent 180, in response to the user 110 accepting the prompt at block 314. Thus, the router agent 180 rejects the file download 187 of the requested data file 192 download on the WAN/Internet 122 in response to the user 110 accepting the prompt of the local download of the requested data file 192. Upon the user accepting the local download of the file at block 314, the local download can begin at block 316. The local download of the requested data file 192 (at block 318) can include a download (of an existing data file 186) from another LAN user 112. The router agent 180 can redirect the initiating user's 110 download request to another router agent 180 for downloading the file from another LAN user 112. The method 300 can download the requested file 192 which is represented as a file download 187 (FIG. 1) at block 318 of FIG. 3. The method ends at block 326.

In another embodiment, a requested data file 192 is downloaded from the WAN/Internet 122 in response to an initiating user 110 declining the prompt at block 312. If the initiating user 110 does not accept a local download of the requested data file 192 at block 314, the method 300 initiates a download from the WAN/Internet 122 at block 320. The requested data file 192 is downloaded from the WAN/Internet 122 by a router agent 180 located on an initiating computer device 142. The download of the requested data file 192 may be executed using a computer readable medium such as a computer. The router agent 180 can retrieve the requested data file 192 from a remote server 136. After downloading the requested data file at block 322, a file download 187 is created on the initiating computer device 142 containing the requested data file 192. The method 300 can store the requested data file's 192 generated hash signature 193 in a local index such as the server indexing 132 at block 324. The requested data file 192 can be stored in the LAN database 194 at block 325. The method 300 ends at block 326.

Thereby, the method of the present disclosure optimizes data transfers for a LAN using a network which accesses a Wide Area Network (WAN) by using a comparison of data, for example a data file, to access available data or a data file on a Local Area Network (LAN) communicating with the (WAN). Moreover, data or a data file can be stored in a local location within a LAN for easy access and for repeated downloading by the users of the LAN, thus providing more efficient downloading.

Figure 4:
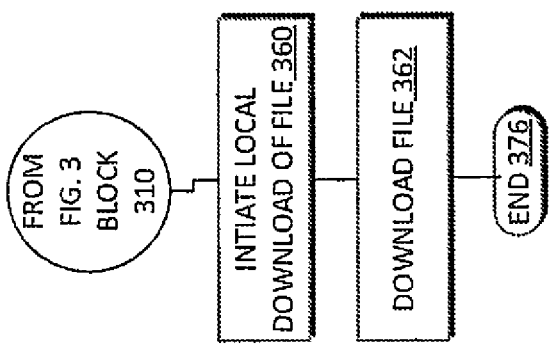
FIG. 4 is a continuation of the flow chart of FIG. 3 and depicts an alternative embodiment of the disclosure.

FIG. 4 depicts an alternative embodiment continuing from the method depicted in FIG. 3, which introduces automatically downloading the requested data file 192 without prompting the initiating user 110. The requested data file's 192 transfer is redirected to a local server address from a WAN/Internet 122 to a local router agent 180 if a LAN database 194 contains a requested data file 192 stored in a LAN database 194. In this embodiment, a download redirect occurs automatically upon the determination that there is a hash signature match. No prompt is sent to an initiating user 110 (FIG. 1). A router agent 180 can initiate a local download of the requested data file 192 based on a hash signature comparison module 174 performing a hash signature comparison and determining that a LAN database 194 contains a copy of the requested data file 192 as an existing data file 186. The method can initiate a local download of the requested data file 192 at block 360 and download the requested data file at block 362. The method ends at block 376.

Figure 5:
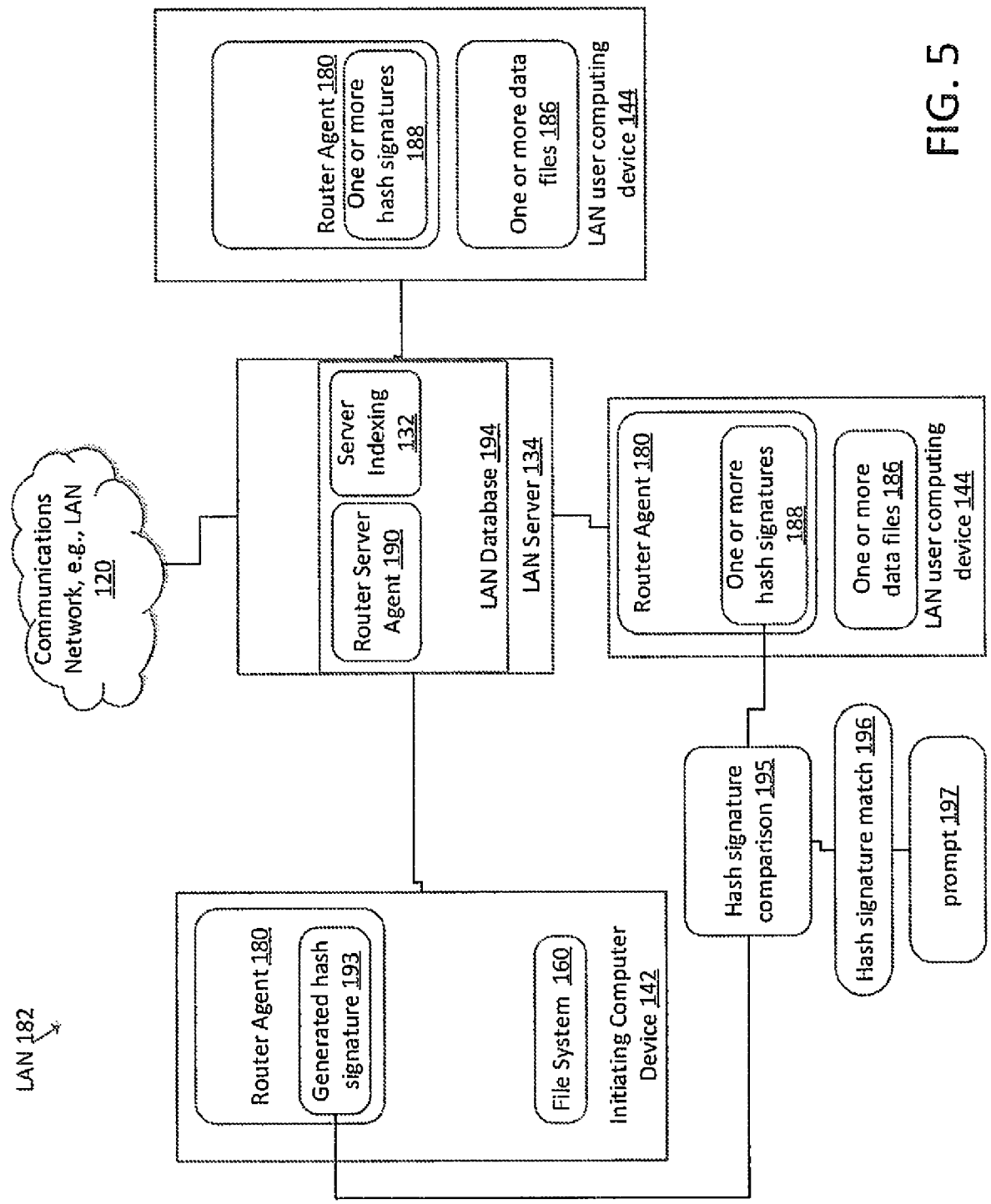
FIG. 5 depicts a schematic block diagram according to an embodiment of the disclosure which cooperates with the system shown in FIG. 1.

Referring to FIGS. 1 and 5, an embodiment of a LAN environment 182 depicts an existing data file 186 indexed on a LAN user's computing device 144. The components depicted include several LAN user computing devices 144, and an initiating computer device 142. A LAN user computing device 144 can also be but is not limited to, for example: a mobile device, desktop, laptop or tablet.

The initiating computer device 142 contains a router agent 180, which includes a generated hash signature 193. The initiating computer device 142 includes a requested data file 192 and a file system 160. The LAN user computing devices 144 also include the router agent 180. The router agent 180 includes an existing hash signature 188 and an existing data file 186. The aforementioned components are part of the LAN environment 182. The initiating computer device 142, and the LAN user computing device 144 are connected to a LAN database 194 and a LAN server 134 via a communications network, such as a LAN communications network 120. The LAN server 134 may contain a router server agent 190, a LAN database 194 and a server indexing 132. In this embodiment, the LAN server 134 manages access to the LAN database 194 and the LAN communications network 120 for the initiating user computer device 142 and the LAN user computer device 144. As mentioned above, the router server agent 190 generally determines which router agent is optimal for the execution of a file download 187. This determination is based on the availability of the router agent 180. The availability of a router agent is determined by factors such as: which router agent 180 has the most bandwidth available, which device's central processing unit (CPU) has low usage e.g. has CPU resources available, and which router agent 180 has the most random access memory (RAM) available.

The components depicted in FIG. 5 can include all of the components and functions previously depicted in FIG. 1. However, in this embodiment the existing data file 186 and its corresponding existing hash signature 188 are located on a LAN user computing device 144 of the LAN database 194 as in FIG. 1. The existing hash signature 188 is depicted as one or more hash signatures 188. The existing data file 186 is depicted as one or more data files 186. The method of FIG. 1 can run a hash signature comparison 195 using the hash signature comparison module 174 (FIG. 2) between the generated hash signature 193 created by the router agent 180 on the initiating computer device 142 and the existing hash signature 188 residing on the router agent 180 on the LAN user computer device 144. A hash signature match 196 occurs where the method determines that the existing hash signature 188 is identical to the generated hash signature 193. Upon determining the hash signature match 196, the method can create a prompt 197 and display it to the initiating user 110. The prompt 197 can appear in the user's computing device 142 in order to ascertain whether the initiating user 110 would like to download the file locally (from another LAN user) or from the WAN/Internet 122.

Figure 6:
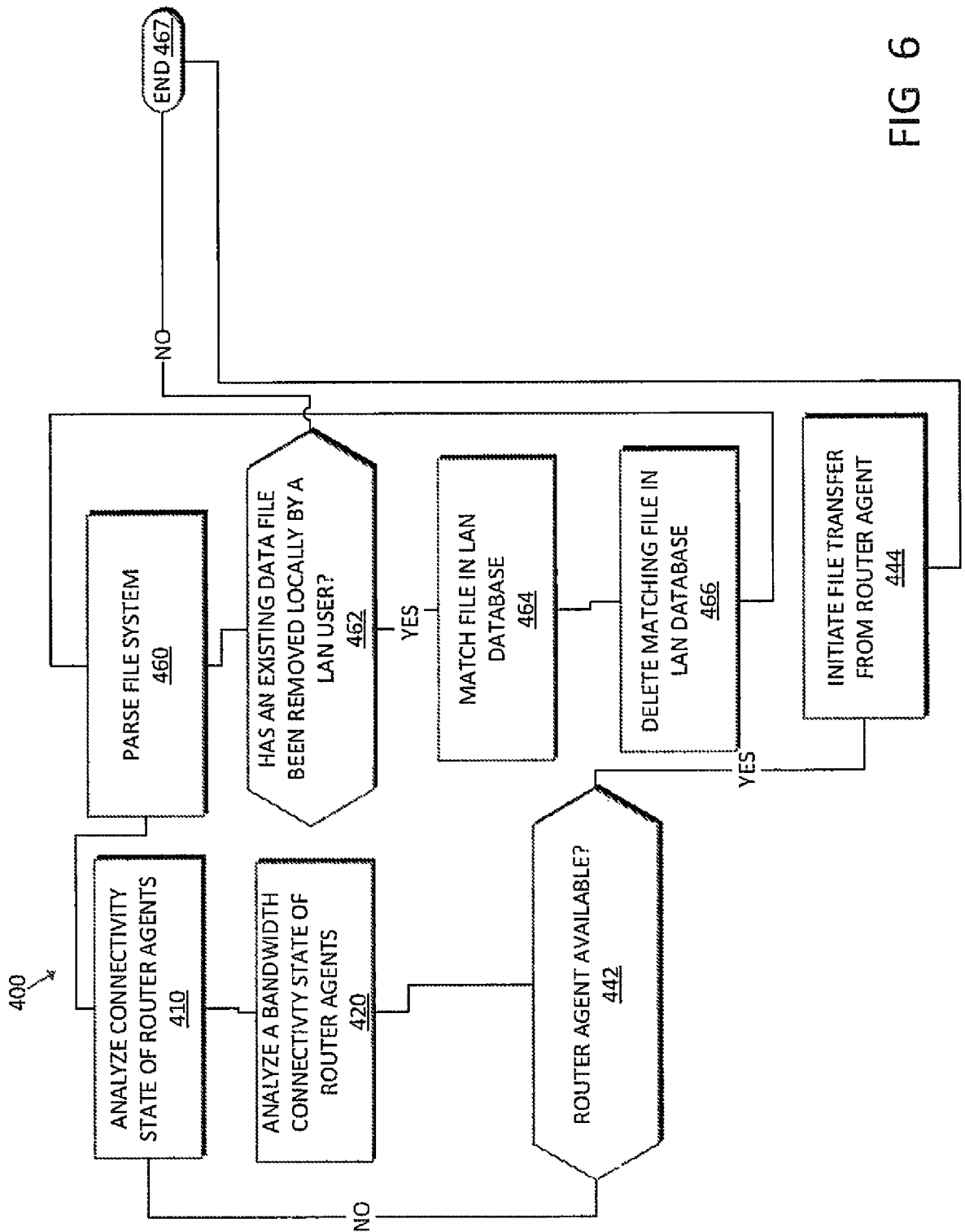
FIG. 6 is a flow chart illustrating a method according to embodiments of the disclosure for optimizing data transfers using an intelligent router agent.

Referring to FIG. 6, a method 400 depicts an alternative embodiment of the method of FIG. 3. The flow chart references the elements depicted in the system of FIG. 1. A router agent 180 routinely synchronizes a LAN database 194 with a file system 160. The router agent 180 parses the file system 160 at block 460. The router agent 180 parses the file system 160 in order to determine whether an existing data file 186 has been deleted by a LAN user 112. The method can determine whether the existing data file has been deleted from the file system 160 at block 462. An existing data file 186 is deemed deleted when it is no longer accessible by the LAN user 112 because the reference to the existing data file 186 has been removed and/or the LAN user computing device 144 can no longer see the file in its file directory. The method proceeds to block 464 if it determines that the existing data file 186 has been removed from the file system 160 by the LAN user 112 at block 462. The method can match the existing data file 186 to its associated record located in the LAN database 194 at block 464. The router agent 180 can delete existing data files 186 from the LAN database 194 if the existing data files 186 are deleted from the user computing device 142 by an LAN user 112 at block 466. The method returns to block 460 and again synchronizes the LAN database 194 and the file system 160. Upon determining that no existing data files 186 have been removed by a LAN user 112, the method can end at block 467.

In another embodiment, the method can determine an availability status of a router agent 180 in a LAN 182 environment. The method can analyze a CPU connectivity state of a router agent 180 to a communications network in a LAN environment 182, and at block 410 communicate with the router agent 180 located in the LAN environment 182. The method can determine whether the router agent 180 has a heartbeat, that is, whether it is connected to and functioning in the LAN environment 182. At block 420 the method can analyze a bandwidth availability state of router agents 180 in the LAN environment 182. A bandwidth availability is a determination of the amount of bandwidth being used and currently available for a router agent in the LAN environment 182. At block 442, a router server agent 190 can use the determination of the amount of bandwidth utilized as well as the CPU connectivity state of the router agent 180 in order to select a location from which to retrieve a requested data file 192. Where the router agent 180 is not utilizing a large amount of bandwidth and its CPU connectivity state is detected as normal (connected and transmitting data), the router agent 180 will be selected as in block 444. The method can end at block 467. This analysis of the router agents 180 creates the additional benefit of selecting the quickest retrieval method for a requested data file 192 if it is identical to an existing data file 186 in local space.

Figure 7:
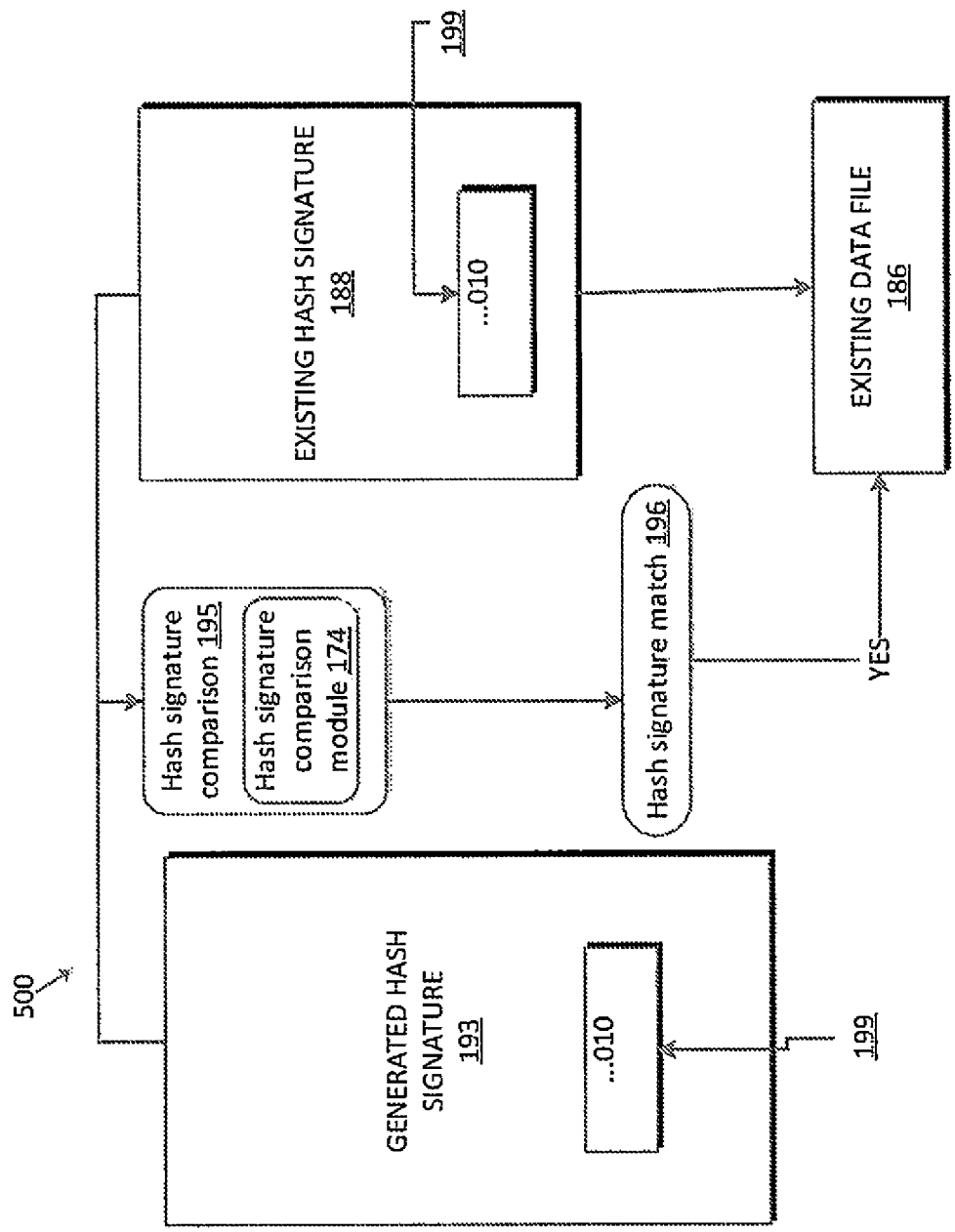
FIG. 7 depicts a diagram of the system elements shown in FIG. 1 according to an embodiment of the disclosure.

FIG. 7 is an embodiment 500, of the method 300, which depicts the hash signature comparison 195 that was discussed above in relation to FIG. 5. The hash signature comparison 195 compares the generated hash signature 193 of the requested data file 192 to the existing hash signature 188 of the existing data file 186 using the hash signature comparison module 174 (shown in FIG. 2). The hash signature comparison 195 determines whether the generated hash signature 193 exists as the existing hash signature 188 in the LAN environment 182. The hash signature comparison module 174 can determine whether the generated hash signature 193 exists on the network. Such a determination is made by the hash signature comparison module 174 looking for the router agent 180 in the LAN environment 182 that contains a record of the generated hash signature 193. As described above, a hash signature can be a unique file identifier represented as an integer, float or a number of bytes. In one example, the generated hash signature 193 and the existing hash signature 188 can both be one byte in size. A byte 199 is represented generically in FIG. 7. In one instance, the byte can have eight bits. The hash signature comparison 195 uses the hash signature comparison module 174 to determine whether the generated hash signature 193 is identical to an existing hash signature 188 in the LAN environment 182.

In this example, the hash signature comparison module 174 has determined that the hash signatures are identical, that is, there is a match between the generated hash signature 193 and the existing hash signature 188, depicted as a hash signature match 196. Upon determining that there is a hash signature match 196, the method of FIG. 3 begins locally retrieving the existing data file 186 instead of attempting to download the requested data file 192 (FIG. 1) on the WAN/Internet 122 (FIG. 1).

Retrieving the requested data file 192 in local space in the LAN environment 182 has several benefits. For example, the LAN user 110 can avoid overburdening the LAN environment's 182 limited bandwidth and storage resources by decreasing the number of large-sized files coming into the LAN environment 182. This is accomplished by the LAN user 110 retrieving the existing data file 186 instead of the requested data file 192 when the hash signature comparison 195 determines that the two files are identical. Second, if the requested data file 192 already exists as the existing data file 186, storage space is saved on the network because a new file is not introduced into the LAN environment 182.

As described above, the method and system of the embodiments of the invention described herein can include a plurality of devices. The devices can each contain a router agent, a file system and an agent indexing. The devices may be connected via an internet network. The network can use a router or switch to direct web traffic on the network. The router or switch can include a router server agent and server indexing to direct and initiate data file downloads based on a hash signature comparison between requested and existing files on the internet connection.

The router server agent can be run by the router and initializes the server index. The server index functions to track devices on the network and track the files downloaded by these machines. The server index tracks these file downloads using unique file identifiers e.g., hash signatures. The hash signatures are created based on a count of the download file's byte stream. A file's byte stream is created based on a count of a 64 or 128 bit sequence in the download file. A file byte stream can also be represented in bytes. The method according to the embodiments of the invention is advantageous as it provides a unique manner of identifying files on a network. Typical networks can use a dynamic uniform resource locator (URL) in order to download files. A dynamic URL is a web reference identifying a resource on the World Wide Web. A URL is dynamic if it is created on demand, i.e. at the time of access. One disadvantage of these typical networks is that a dynamic URL is recreated with each file download or access. Dynamic URLs cannot be used for storing file identifiers on a network for later download. As a result in these kinds of typical networks, it is difficult to tell whether a requested file already exists on a network.

In embodiments of the present disclosure, the plurality of devices on the network can each contain a router agent and agent index. The agent index maintains the hash file signatures mapped to the downloaded files. The network devices can request file downloads. A router server agent can intercept the requests and check a server indexing in order to determine whether the files exist on the network. The router server agent can determine the router agent that can handle the request based on a determination of factors including: available bandwidth and connectivity status.

In one example, a file can be downloaded for the first time into the network. The server indexing can determine that the file does not exist on the network. The server indexing may redirect the router to retrieve the file from a server on the network. After a successful download, the server indexing can create an entry in its index containing the new file's file signature and a record of the machine which downloaded the file. An agent indexing can also create an entry with the file's file signature and location on the network.

In an alternative example, a file can be already saved on the network from a previous download. A router server agent can provide the requesting computer with the address of the machine/device where the file was previously downloaded. The requesting device's router agent may connect with the router agent of the device that previously downloaded the file. The device that previously downloaded the file's router agent can look up the agent indexing to find a file record and confirm whether there is a match. The requesting device's router agent can start the file transfer with the target machine's router agent using an existing file transfer technology e.g., peer to peer (P2P), file transfer protocol (FTP).

After a successful a file transfer, the agent indexing can update and synch the record with the server indexing. The router agents can monitor the network and update the router server agent if files are removed from the network. The router agents can synchronize with the router server agent in order to ensure an accurate accounting of files in the network.

Further aspects of the present disclosure can include a system with a special router agent which tracks files downloaded in it and creates hash signatures for these downloaded files. These hash signatures can be created using a file byte stream sequence which is created prior to download. The router agent can initialize the file byte stream sequence based on a protocol which determines the minimum possible length of the file byte stream. This initialization ensures that all files on the LAN have unique identifiers. As new files are added, the file byte stream protocol can be updated to adjust the standard file byte stream and hash signature protocol. Alternatively, this protocol update can happen after a time period specified by the system administrator.

All router agents communicate with other router agents either in a centralized or decentralized system architecture. A router agent located on a user's computer can track file downloads on a user machine. When a user opens a URL to download a file, the browser can start to retrieve the file from its original location on a remote server. The router agent on the user's computer can concurrently compute a hash signature for the target file based on the file byte stream created by the router agent. This creates a unique identifier which the router agent attempts to match to another file within the LAN. If there is a match, the router agent may select a local router agent to download the file. The router agent makes this selection based on a set of criteria such as: router agent availability (based on router agent heartbeat), router agent bandwidth, and whether the user machine containing the target file is online. This process is run continuously to ensure that files can be optimally downloaded based on the router agents' availability. Once the user computer router agent determines the optimal router agent for file download, the user computer router agent can send an alert to the user's browser. This alert can ask the user to download the target file locally for faster retrieval. As stated earlier, file transfers between LAN users can be executed using one of the existing file transfer technologies e.g., peer to peer (P2P), file transfer protocol (FTP).

As a result of the features described in the present disclosure, and as a result of the file being fetched from local space (e.g., the LAN environment), the file transfer would be faster than downloading using via a WAN. The present system ensures choosing the right target router agent (for example, based on their load, network speed, RAM availability, etc.), and thus improves efficiency and user satisfaction.

Embodiments of the present disclosure include a router agent maintaining (i) Hash Signatures for files based on the initial sequence of file byte-stream (Based on the files in the network, system computes the minimum possible length (L) such that "L" length byte stream of all the files in the network are unique), and (ii) a CPU, bandwidth connectivity state of other router-agents. When a user starts downloading a new file from server, a router agent computes the hash signature of the currently downloaded file based on the initial received byte stream, and swaps the server-address from external server to local target agent (if local target agent has same file based on hash signature comparison).

Since the above approach uses the hash signature of the initial byte stream whose length is determined using the method described above, the approach can effectively index the files in the network with minimal indexing space for fast retrieval. Also, another advantage of the present disclosure is that since the router agent keeps track of the various client parameters of the participating entities, the router can choose the right target (when many exists) for a fast download in response to download delays when downloading from a WAN.

Figure 8:
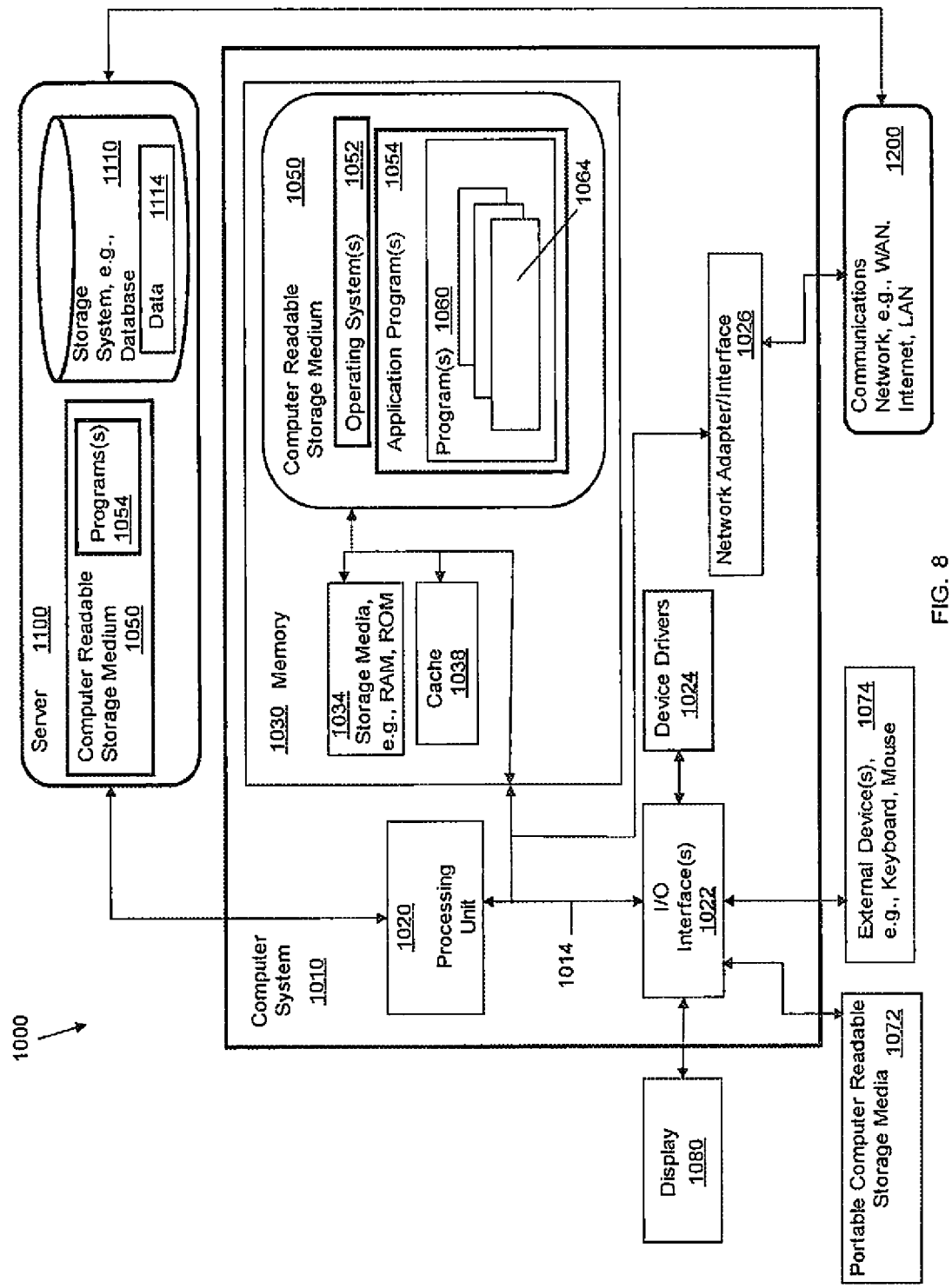
FIG. 8 is a schematic block diagram depicting a computer system according to an embodiment of the disclosure which includes a detailed depiction of a computer shown (generally in FIG. 1) and which cooperates with the system and methods shown in FIGS. 1, 2, 3, 4, 5.

Referring to FIG. 8, a system 1000 includes a computer system or computer 1010 shown in the form of a generic computing device. The method 300, for example, may be embodied in a program(s) 1060 (FIG. 8) embodied on a computer readable storage device, for example, generally referred to as memory 1030 and more specifically, computer readable storage medium 1050 as shown in FIG. 8. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 8 are generic representations of a computer and program that may be local to a user, or provided as a remote service (for example, as a cloud based service), and may be provided in further examples, using a website accessible using the communications network 1200 (e.g. interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 8 as program modules 1064. The program 1060 and program modules 1064 can execute specific steps, routines, sub-routines, instructions or code, of the program.

The method of the present disclosure can be run locally on a device such as a mobile device, or can be run on a service, for instance, on the server 1100 which may be remote and can be accessed using the communications network 1200. The program or executable instructions may also be offered by a service provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 8, the system 1000 includes the computer system shown in the form of a general purpose computing device with illustrative periphery devices. The components of the computer system 1010 may include, but are not limited to, one or more processors or processing units 1020, a system memory 1030, and a bus 1014 that couples various system components including system memory 1030 to processor 1020. The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and or/cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and a an optical disk drive for reading from or writing to a removable, non-volatile optical disk such as a CD-ROM, DVD-ROM, or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 300 (FIG. 3), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. The computer 1010 may also communicate with one or more external devices 1074 such as a keyboard, a pointing device, a display 1080, etc.; one or more devices that enable a user to interact with computer 1010; and/or any devices (e.g., network card, modem, etc.) that enables the computer 1010 to communicate with one or more computing devices. Such communication can occur via the Input/Output (I/O) interfaces 1022. Still yet, the computer 1010 can communicate with one or more networks 1200 such as local area network (LAN), a general wide area network (WAN/Internet), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc. It is understood that a computer or a program running on the computer 1010 may communicate with a server, embodied as the server 1100, via one or more communications networks, embodied as the communications network 1200. The communications network 1200 may include transmission media and network links which include, for example, wireless, wired or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN/Internet).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN/Internet), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
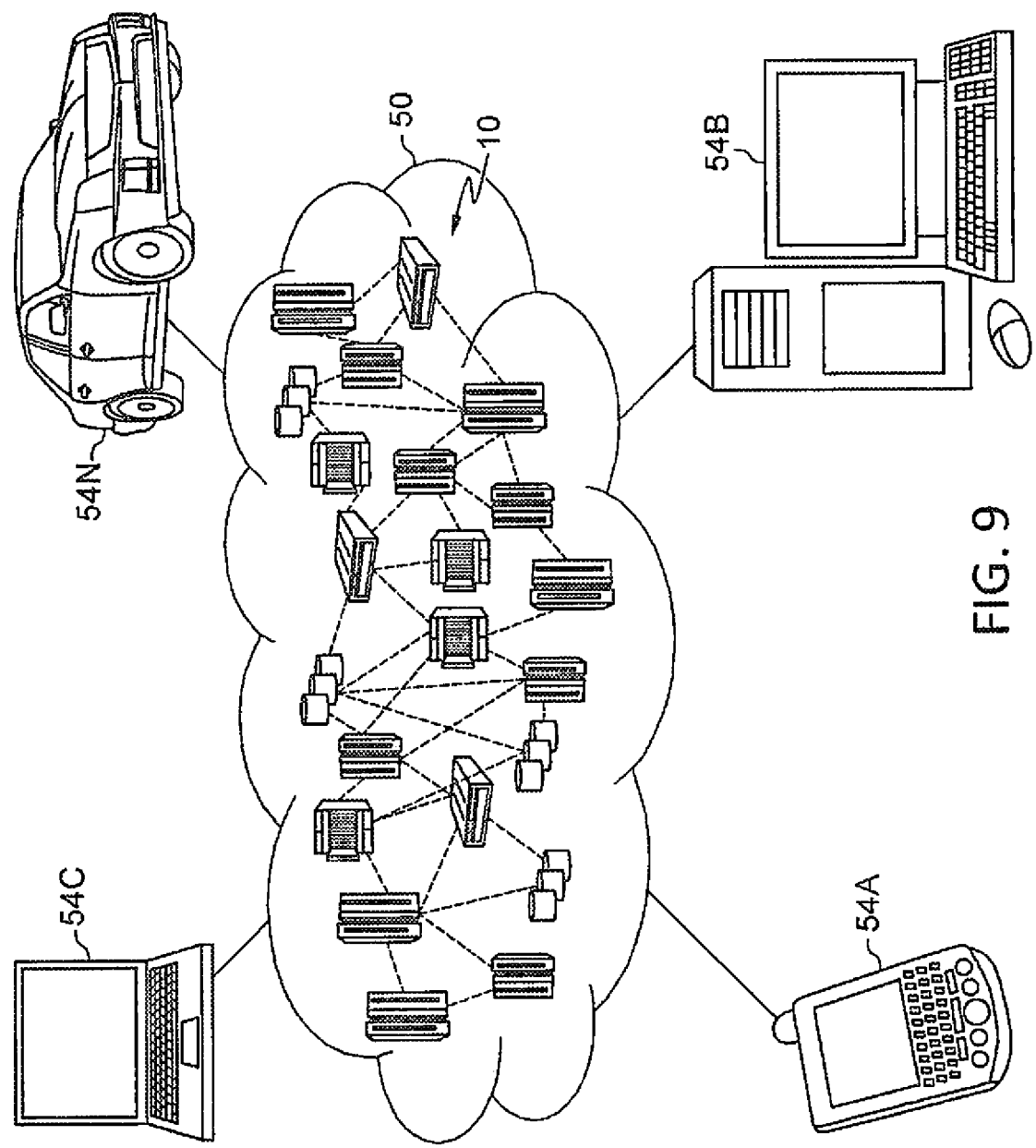
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 10:
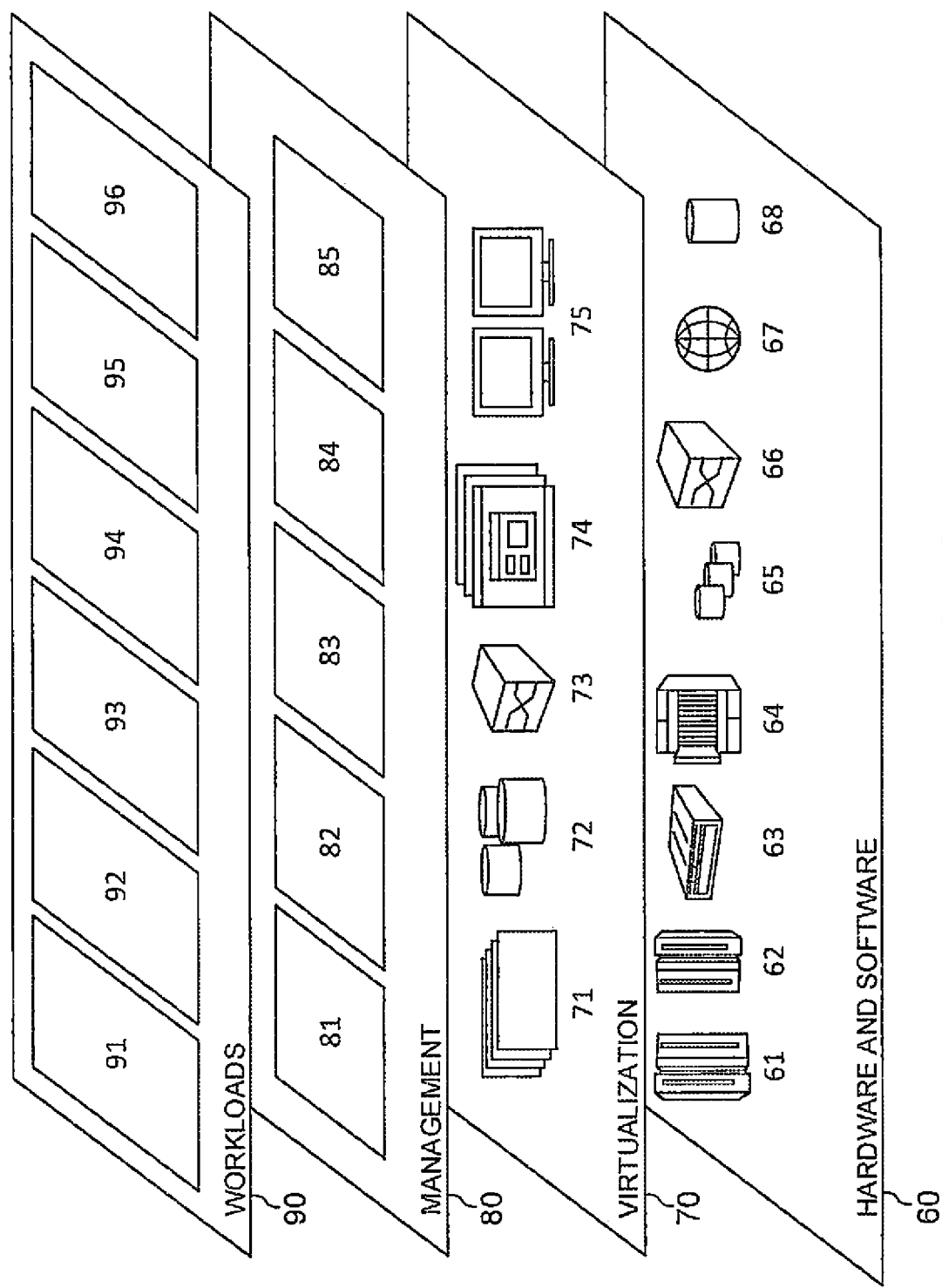
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data file transfer optimization 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later depicted.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing data file transfers utilizing a router agent, comprising:
   generating a hash signature, for a requested data file using a router agent of a Local Area Network (LAN) and based on a received file byte-stream by the router agent, in response to an initiating user requesting the requested data file using a computer on a LAN communicating with a Wide Area Network (WAN/Internet), the requested data file being stored on a remote computer readable storage medium accessible using the WAN/Internet, the router agent configuring the received file byte-stream for the requested data file from the Wide Area Network, the generating of the hash signature including:
      the router agent configuring the received file byte-stream for the requested data file from the WAN/Internet which includes determining a size in bytes of the requested data file; and
      assigning the hash signature to the requested data file using the router agent, after determining the size in bytes of the requested data file, and the router agent generating the hash signature as a unique output represented as a number of bytes based on the received file byte-stream and the size in bytes of the requested data file;
   comparing the generated hash signature of the requested data file with an existing hash signature of an existing data file stored on a local computer readable storage medium accessible using the local area network;
   determining an optimal router agent of a plurality of router agents which is optimal for executing a file download of the existing data file, in response to the generated hash signature matching the existing hash signature of the existing data file;
   determining an availability of a router agent as part of the determining the optimal router agent, the determining of the availability of the router agent including factors, the factors including which router agent has the most bandwidth available, which device's central processing unit has low usage, and which router agent has the most access memory available, and the factors also including whether a user machine containing the target file is online;
   selecting the optimal router agent, based on the determining of which router agent is optimal, for providing the existing data file for download; and
   prompting the initiating user to accept a local download using the LAN of the existing data file on the local computer readable storage medium using the selected optimal router agent, in response to the generated hash signature matching the existing hash signature of the existing data file, and the selection of the optimal router agent.

2. The method of claim 1, comprising:
   generating hash signatures for a plurality of requested data files; and
   storing the generated hash signatures for the plurality of requested data files.

3. The method of claim 2, comprising:
   comparing the generated hash signatures of the requested data files to a plurality of stored existing hash signatures corresponding to a plurality of stored existing data files.

4. The method of claim 1, further comprising:
   rejecting the requested data file using the router agent, in response to the initiating user accepting the prompt of the local download of the requested data file.

5. The method of claim 1, wherein the requested data file is downloaded from the WAN/Internet in response to the initiating user declining the prompt of the local download of the requested data file.

6. The method of claim 1, wherein an existing data file is indexed in a LAN database.

7. The method of claim 1, further comprising:
   automatically initiating a local download of the existing data file using the LAN on the local computer readable storage medium, based on the generated hash signature for the requested data file's matching an existing data file's existing hash signature stored in a LAN database.

8. The method of claim 6, wherein the router agent routinely synchronizes the LAN database with a file system; and the method further comprising:
   deleting existing data files from the LAN database when the existing data files are deleted from a local computing device by an end user.

9. The method of claim 1, wherein an availability status of the router agent is determined; and the method further comprising:
   analyzing a CPU connectivity state of the router agent in the LAN, the CPU connectivity state being determined by detecting that the router agent is connected to a communications network in the LAN; and
   analyzing a bandwidth availability state of the router agent in the LAN, the bandwidth availability state being determined by assessing an amount of bandwidth available for use by the router agent.

10. The method of claim 1, the method further comprising:
    downloading the requested data file from the local computer readable storage medium in the LAN, in response to the initiating user accepting the prompt.

11. A system for optimizing data file transfers utilizing a router agent, the system comprising:
    a computer system comprising: a computer processor, a computer-readable storage medium, and program instructions stored on the computer-readable storage medium being executable by the processor, to cause the computer system to perform a method, comprising:
    generating a hash signature, for a requested data file using a router agent of a Local Area Network (LAN) and based on a received file byte-stream by the router agent, in response to an initiating user requesting the requested data file using a computer on a LAN communicating with a Wide Area Network (WAN/Internet), the requested data file being stored on a remote computer readable storage medium accessible using the WAN/Internet, the router agent configuring the received file byte-stream for the requested data file from the Wide Area Network, the generating of the hash signature including:
  the router agent configuring the received file byte-stream for the requested data file from the WAN/Internet which includes determining a size in bytes of the requested data file; and
  assigning the hash signature to the requested data file using the router agent, after determining the size in bytes of the requested data file, and the router agent generating the hash signature as a unique output represented as a number of bytes based on the received file byte-stream and the size in bytes of the requested data file;
comparing the generated hash signature of the requested data file with an existing hash signature of an existing data file stored on a local computer readable storage medium accessible using the local area network;
determining an optimal router agent of a plurality of router agents which is optimal for executing a file download of the existing data file, in response to the generated hash signature matching the existing hash signature of the existing data file;
determining an availability of a router agent as part of determining the optimal router agent, the determining of the availability of the router agent including factors, the factors including which router agent has the most bandwidth available, which device's central processing unit has low usage, and which router agent has the most access memory available, and the factors also including whether a user machine containing the target file is online;
selecting the optimal router agent, based on the determining of which router agent is optimal, for providing the existing data file for download; and
prompting the initiating user to accept a local download using the LAN of the existing data file on the local computer readable storage medium using the selected optimal router agent, in response to the generated hash signature matching the existing hash signature of the existing data file, and the selection of the optimal router agent.

12. The system of claim 11, comprising:
generating hash signatures for a plurality of requested data files; and
storing the generated hash signatures for the plurality of requested data files.

13. The system of claim 12, comprising:
comparing the generated hash signatures of the requested data files to a plurality of stored existing hash signatures corresponding to a plurality of stored existing data files.

14. The system of claim 11, further comprising:
rejecting the requested data file using the router agent, in response to the initiating user accepting the prompt of the local download of the requested data file.

15. The system of claim 11, wherein the requested data file is downloaded from the WAN/Internet in response to the initiating user declining the prompt of the local download of the requested data file.

16. A computer program product for optimizing data file transfers utilizing a router agent, the computer program product comprising a computer readable storage medium having program instructions embodied therewith, wherein the computer readable storage medium is not a transitory signal per se, the program instructions executable by a computer to cause the computer to perform a method, comprising:
generating a hash signature, for a requested data file using a router agent of a Local Area Network (LAN) and based on received file byte-stream by the router, in response to an initiating user requesting the requested data file using a computer on a LAN communicating with a Wide Area Network (WAN/Internet), the requested data file being stored on a remote computer readable storage medium accessible using the WAN/Internet, the router agent configuring the received file byte-stream for the requested data file from the Wide Area Network, the generating of the hash signature including:
  the router agent configuring the received file byte-stream for the requested data file from the WAN/Internet which includes determining a size in bytes of the requested data file; and
  assigning the hash signature to the requested data file using the router agent, after determining the size in bytes of the requested data file, and the router agent generating the hash signature as a unique output represented as a number of bytes based on the received file byte-stream and the size in bytes of the requested data file;
comparing the generated hash signature of the requested data file with an existing hash signature of an existing data file stored on a local computer readable storage medium accessible using the local area network;
determining an optimal router agent of a plurality of router agents which is optimal for executing a file download of the existing data file, in response to the generated hash signature matching the existing hash signature of the existing data file;
determining an availability of a router agent as part of determining the optimal router agent, the determining of the availability of the router agent including factors, the factors including which router agent has the most bandwidth available, which device's central processing unit has low usage, and which router agent has the most access memory available, and the factors also including whether a user machine containing the target file is online;
selecting the optimal router agent, based on the determining of which router agent is optimal, for providing the existing data file for download; and
prompting the initiating user to accept a local download using the LAN of the existing data file on the local computer readable storage medium using the selected optimal router agent, in response to the generated hash signature matching the existing hash signature of the existing data file, whereby the existing data file is a copy of the requested data file, and the selection of the optimal router agent.

17. The computer program product of claim 16, comprising:
generating hash signatures for a plurality of requested data files; and
storing the generated hash signatures for the plurality of requested data files.

18. The computer program product of claim 17, comprising:
comparing the generated hash signatures of the requested data files to a plurality of stored existing hash signatures corresponding to a plurality of stored existing data files.

19. The computer program product of claim 16, further comprising:
   rejecting the requested data file using the router agent, in response to the initiating user accepting the prompt of the local download of the requested data file.

20. The computer program product of claim 16, wherein the requested data file is downloaded from the WAN/Internet in response to the initiating user declining the prompt of the local download of the requested data file.

\* \* \* \* \*